Inventors
ROBERT W. MEYER
ROBERT G. SWANSON
By Rule and Hoge
Attorneys

United States Patent Office 2,793,746
Patented May 28, 1957

2,793,746

METHOD AND APPARATUS FOR INSPECTING CAPS

Robert W. Meyer, Elgin, and Robert G. Swanson, Dundee, Ill., assignors to Owens-Illinois Glass Company, a corporation of Ohio Application April 2, 1953, Serial No. 346,364

15 Claims. (Cl. 209—111)

This invention is directed to the inspecting of caps for bottles, jars, or other containers, and more particularly to the inspecting of plastic caps to determine the presence or absence of liners or imperfections in the liners.

In the manufacture of caps of certain types, it is current practice to insert disk liners therein in order to facilitate obtaining a proper seal when the cap is applied to a container. For example, a cardboard liner is inserted in plastic caps which are intended for subsequent application to glass containers. In the handling of these caps having liners therein, either in the manufacturer's plant, in transit, or in the packager's plant, the liners often become displaced and drop out or sometimes become mutilated. Since packaging lines are operated at very high speeds it has not been practical or possible to visually inspect the caps in order to determine the presence or absence of liners prior to applying them to containers. As a result, caps without liners, or with misplaced or mutilated liners have often been applied to containers, resulting in leakage or spoilage of the contents, and even injury to the consumer, if the product is toxic or caustic.

It is therefore an object of this invention to provide a method and apparatus whereby caps may be quickly, easily and efficiently inspected to determine the presence or absence of a liner or the condition of the liner.

Another object of the invention is to provide such a method and apparatus which may be utilized either in the manufacturer's plant or in the packager's plant with a minimum of extra handling of the caps.

A further object of the invention is to provide such a method and apparatus which has sufficient flexibility to be adapted to the erratic and non-uniform movement of caps such as is found in a packaging line.

Other objects of the invention will appear hereinafter.

Basically the invention comprises moving the caps successively and intermittently under the action of gravity past an inspection station where the caps are inspected. Caps having no liners or liners of a predetermined degree of mutilation are rejected while the remaining caps are caused to pass on. In the invention, light is directed into each cap and the light reflected from the cap is utilized to affect a photocell circuit preset in accordance with the light reflected from a substantially perfect cap and liner.

Figure 1:
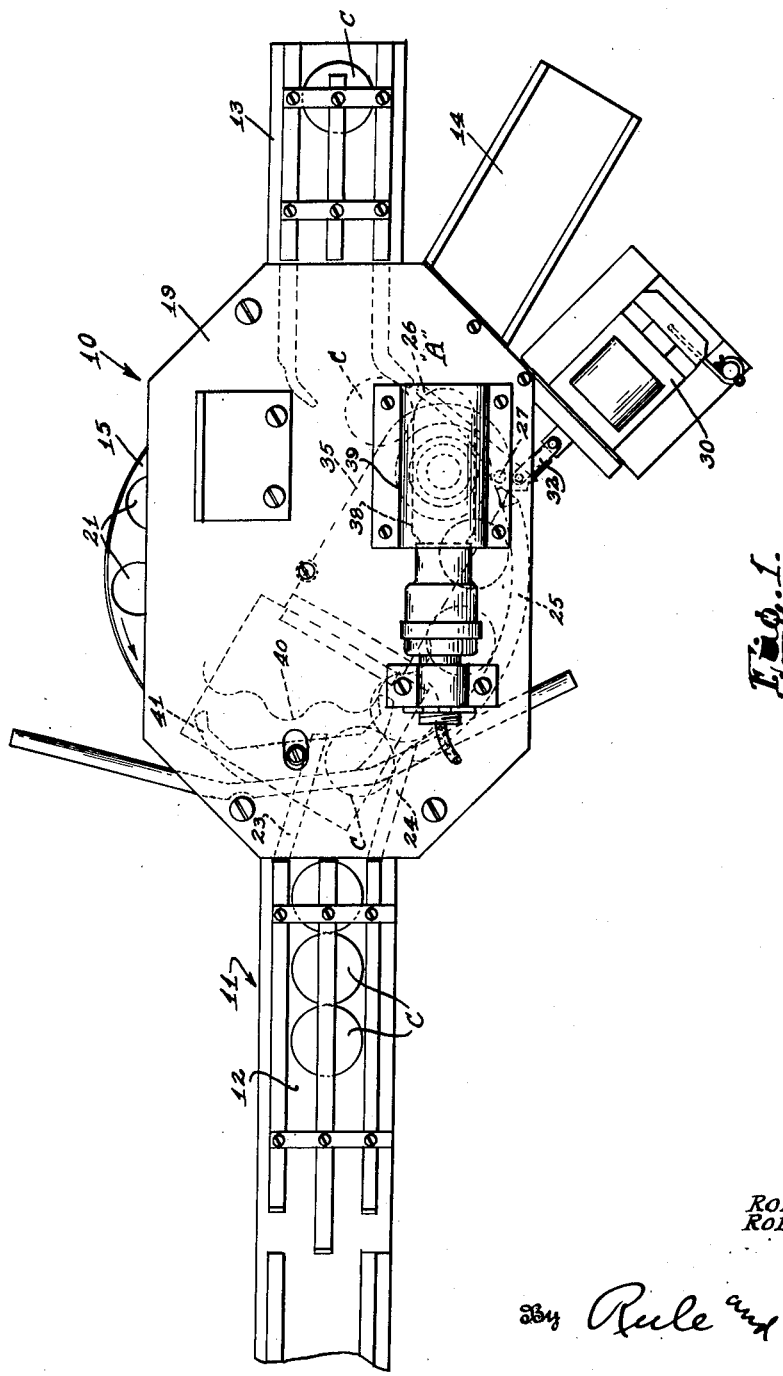
Figure 2:
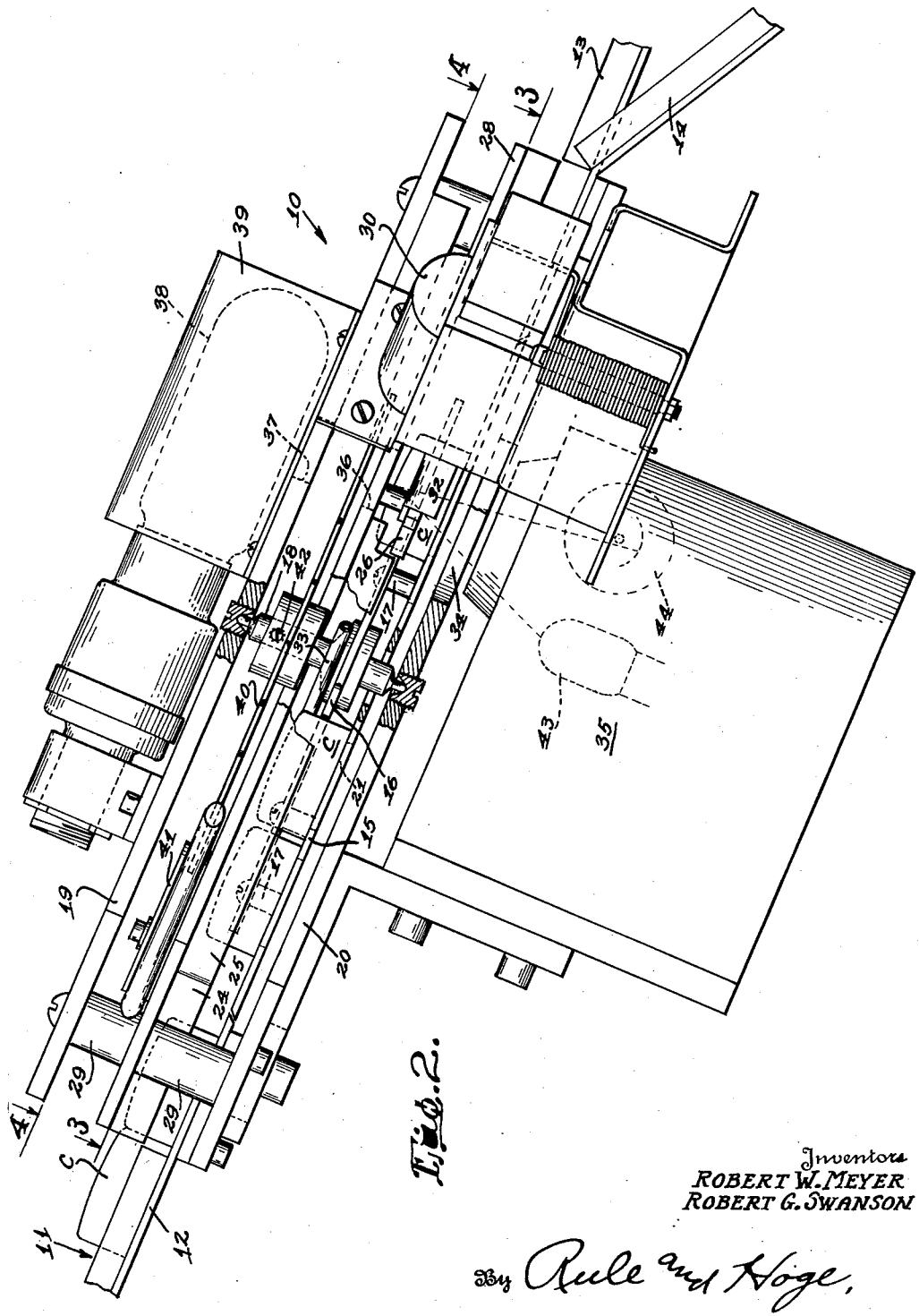
Figure 3:
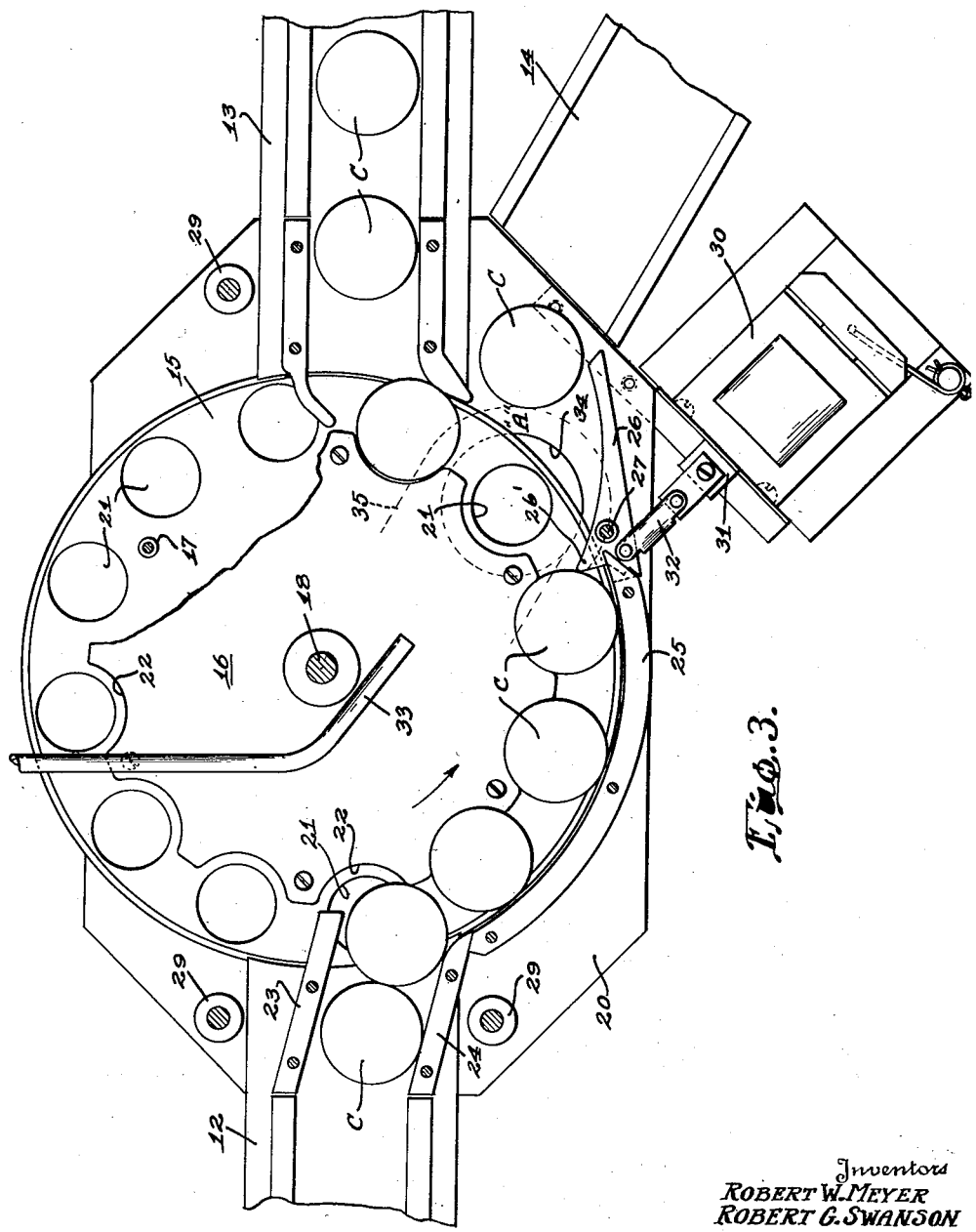
Figure 4:
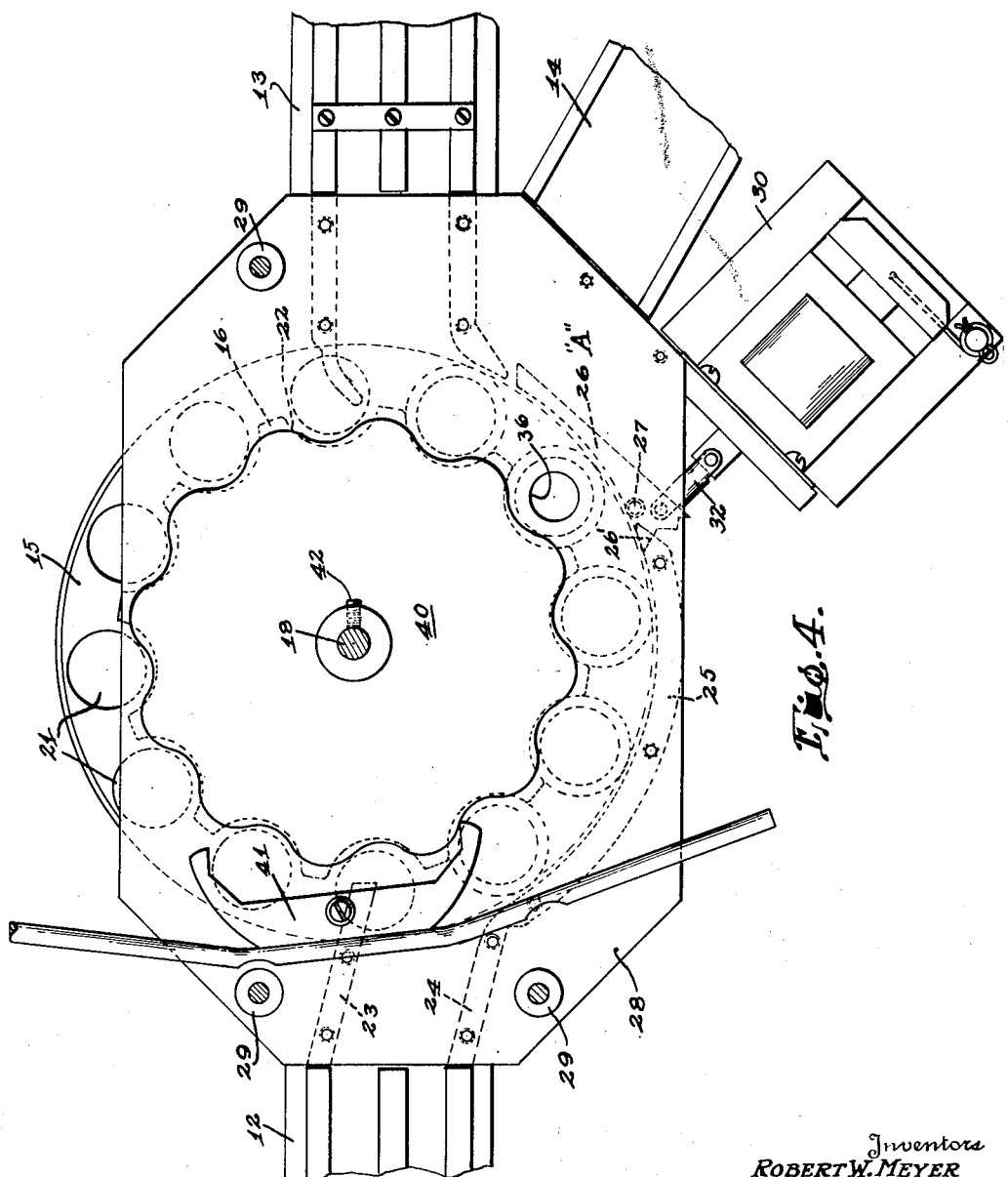
Figure 5:
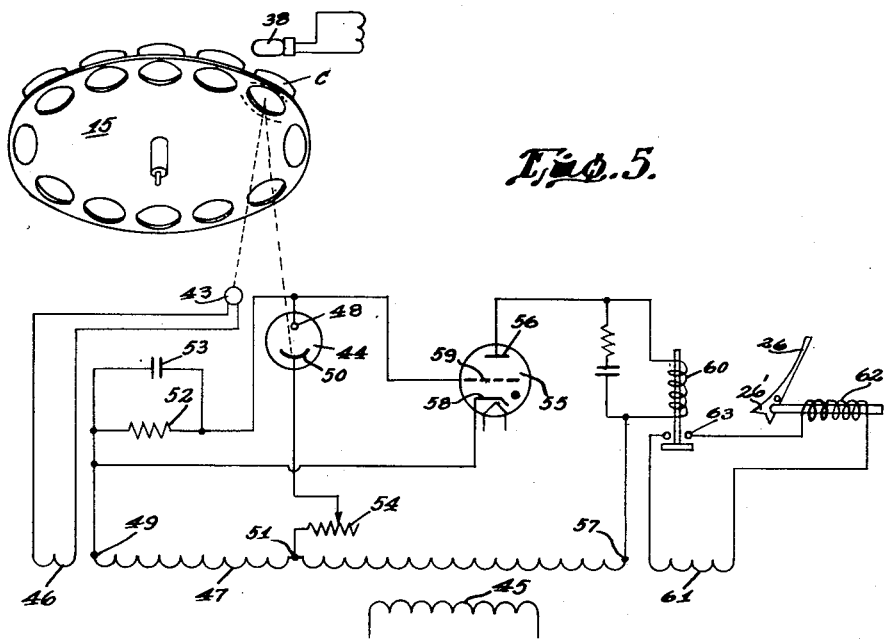
Figure 6:
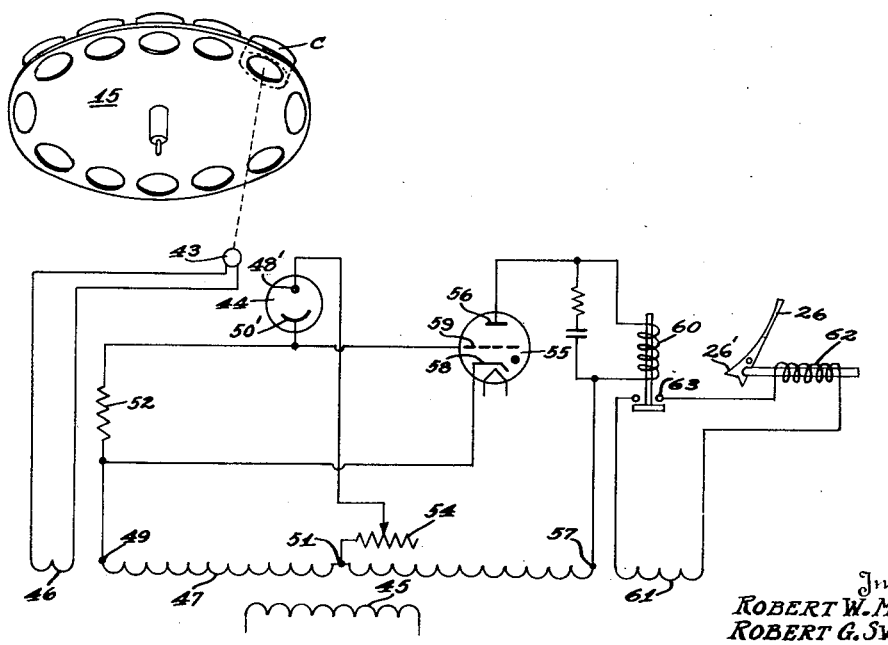

Referring to the accompanying drawings:

Fig. 1 is a plan view of the inspecting apparatus;
Fig. 2 is a part sectional elevational view thereof;
Fig. 3 is a sectional view at the line 3—3 on Fig. 2;
Fig. 4 is a sectional view at the line 4—4 on Fig. 2;
Fig. 5 is a wiring diagram of the apparatus including a schematic representation of the means for conveying the caps; and
Fig. 6 is a wiring diagram of a modified form of the apparatus.

Referring to Figs. 1 and 2, an inspection assembly 10 is mounted in chute 11 at an inclined angle. Caps C enter the apparatus by means of a chute section 12 and after being inspected are removed by means of chute section 13. The caps are caused to move through the apparatus in an arcuate path, and as each cap pauses momentarily at station A it is inspected. Defective caps are ejected to chute 14.

As shown in Fig. 3, the inspection assembly 10 includes a circular disk 15 on which the caps are carried through the inspection unit. The disk 15 is mounted in spaced relationship to a star wheel 16 by means of spacers 17 (Fig. 2). The star wheel in turn is mounted on a shaft 18 jeweled for free rotation between the plates 19 and 20. As shown in Fig. 3, the disk 15 is provided with equally spaced openings 21 along the periphery thereof, the diameter of said openings being substantially equal to the inner diameter of the caps which are to be inspected. The star wheel 16 is provided with pockets 22 so positioned with respect to the disk 15 as to maintain the caps in concentric relationship with the openings 21.

Rails 23, 24 are provided on an intermediate plate 28 to guide the caps from the chute section 12 onto the disk 15. The caps are guided onto the disk on a line which does not intersect the axis of the disk 15. By this off-center entrance, the weight of the caps tends to cause rotation of the disk and star wheel. A railing 25 aids in maintaining the caps in position on the disk 15.

A switch 26 adjacent the inspection station A, is pivoted intermediate its ends at 27 on the plate 28 which is mounted between the plates 19 and 20 by spacers 29. The plate 28 has a portion thereof cut away to prevent interference with rotation of the shaft 18. A solenoid 30 is mounted adjacent the inspection station A, and one end of the pivoted switch 26 is connected to plunger 31 of the solenoid by linkage 32. Energization of the solenoid as hereinafter described swings the switch 26 to the Fig. 3 position, thereby removing the restraining action of the switch on the cap and permitting the cap to fall out of the pocket of the star wheel onto chute 14. The pivoted switch 26 has a heel 26' formed on one end thereof. When the solenoid is energized causing the switch 26 to pivot, the heel 26' contacts the next succeeding cap and prevents rotation of the disk 15. Positive ejection of the cap is achieved by utilizing a continuous air blast from air pipe 33.

As shown in Fig. 2, the lower plate 20 is provided with an opening 34 at the inspection station A. A scanner unit 35 positioned below the opening 34, comprises a case in which is mounted a light source 43 for directing a light beam upwardly into the open end of the cap and a photocell 44 for collecting the reflected light as hereinafter described.

The upper plate 19 and intermediate plate 28 are provided with a small opening 37, and opening 36, respectively, concentric with opening 34 at the inspection station. A light source 38 is mounted above the opening 37 and is provided with a shield 39 to direct the light downwardly through the openings 37, 36, and 34.

Referring to Fig. 4, the inspection assembly includes means for causing an intermittent movement of the caps through the inspection assembly. This comprises an escapement mechanism consisting of an escapement wheel 40 mounted on shaft 18 and an escapement pendulum 41 pivotally mounted on plate 28. The escapement mechanism operates in the normal manner of a dead weight escapement. As a row of caps is directed in off-center relationship onto the disk 15, the weight thereof tends to cause rotation of the disk. Continuous rotation is prevented by the escapement mechanism which causes the movement to be intermittent sufficiently to permit the caps to hesitate momentarily at the inspection station A. Each movement of the cap is equal to the distance between centers of adjacent openings in the disk 15. Adjustment of the escapement wheel on shaft 18 is provided through set screw 42 in order that the caps may be caused to pause in concentric relationship to the opening at the inspection station A.

Fig. 5 shows the wiring diagram of the apparatus as used for inspection of plastic caps such as those made of polystyrene and the like wherein the plastic material has a lesser reflectivity than the liner material.

As shown in Fig. 5, primary coil 45 of a transformer supplies power to secondary coils 46, 47, and 61. The coil 46 in turn supplies current to the light source 43, which directs a light beam into the cap being inspected. The photocell 44 which receives the light reflected from the cap is in a circuit which includes part of the transformer coil 47. Anode 48 of the photocell 44 is connected to terminal 49 of the coil 47 and cathode 50 of the photocell 44 is connected at point 51 intermediate the ends of the coil 47. Resistance 52 is in series with the anode 48 and capacitor 53 is in parallel with the resistance 52. A variable resistance 54 is provided in series with the cathode 50.

A Thyratron 55 is provided in circuit with the coil 47, plate 56 of the Thyratron being connected to terminal 57 of the coil 47 and cathode 58 being connected to terminal 49 of the coil 47. Anode 48 of the photocell is connected to grid 59 of the Thyratron. A relay 60 is provided in the plate circuit of the Thyratron, the relay being energized when the Thyratron is fired. Coil 62 of the switch-actuating solenoid is in series with the transformer secondary coil 61, the solenoid being energized when contacts 63 are closed by energization of relay 60. The solenoid coil 62 when thus energized actuates the switch 26.

During the half cycle when the terminal 49 of transformer coil 47 is positive, the other terminal 57 of the coil is negative and current cannot pass through the Thyratron 55 since a negative potential is applied to the plate 56 of the Thyratron. During this same half cycle current will flow through the photocell as light is being applied to the photocell, the current flowing from the cathode 50 to the anode 48 through the resistance 52 to terminal point 49 and in turn to point 51 and through the resistance 54 back to the cathode. This current flow causes the end of the resistance 52 which is nearest the grid 59 of the Thyratron to be negative relatively to the terminal 49 and simultaneously charges the capacitor 53.

During the next half cycle when terminal 49 is negative and terminal 57 is positive, the Thyratron could pass current since the plate 56 is positive but this is prevented by the negative potential applied to the grid 59 by the capacitor 53. However, if the amount of light reaching the photocell during the next half cycle is substantially decreased or completely eliminated, as would be the case where there is no liner in the cap, the capacitor 53 will be insufficiently charged and on the following half cycle the potential applied to the grid of the Thyratron will be insufficient to prevent the Thyratron from firing. Firing of the Thyratron will cause the relay 60 to close contacts 63 energizing solenoid coil 62 and pivoting switch 26. This will permit removal of the cap. After the cap has been removed light from light source 38, which is in alignment with the photocell, will strike the photocell and cause a current flow in the photocell circuit and in turn charge capacitor 53. The charge from capacitor 53 will thereupon be applied to the grid of the Thyratron and prevent flow of current through the Thyratron, in turn opening contacts 63 and de-energizing the solenoid coil.

The response of the electrical circuit to variations in light supplied to the photocell may be adjusted by moving the wiper of resistance 54. Movement of the wiper towards the point 51 lessens the resistance in the photocell circuit and as a result the amount of light needed to maintain the capacitor 53 charged sufficiently to prevent Thyratron 55 from firing is lessened. Movement of the wiper away from the point 51 increases the resistance in the photocell circuit and the amount of light necessary to keep the capacitor charged is increased. By proper adjustment of the wiper, the photocell circuit may be caused to energize the Thyratron by the light reflected from any particular liner condition, for example absence of a liner, misplacement of a liner or mutilation of a liner.

The disk 15 is made of a material such as aluminum having reflectivity which is equal to or greater than the reflectivity of the liner material in order that light will be reflected from the disk to the photocell in the interval that the disk is moving the next cap into position to be inspected. The same may be accomplished by coating the under surface of the disk with a material having a reflectivity equal to or greater than the reflectivity of the liner material.

The operation of the apparatus may be summarized as follows:

As a row of caps, made of a material having lesser reflectivity than the liners therein, enters the inspection apparatus through chute section 12 onto the disk 15 in an off-center relationship thereto, the weight of the caps tends to cause the disk 15 to rotate in a counterclockwise direction as viewed in Fig. 1. Continuous movement of the disk is prevented by the escapement mechanism which causes the movement to be intermittent and thereby permits each cap to hesitate momentarily at the inspection station A. Light from the light source 43 is directed upwardly into each cap at the inspection station and is reflected therefrom into the photocell 44. If the liner is present and in a satisfactory condition, the amount of light reflected is sufficient to charge the capacitor 53 and prevent the Thyratron from firing. If the liner is absent or in a mutilated condition the amount of light reflected is less and the charge on the capacitor 53 is proportionately less, in turn diminishing the negative potential on the grid of the Thyratron and permitting the Thyratron to fire. Firing the Thyratron energizes relay 60 closing contacts 63 and in turn energizing the solenoid coil 62. This moves the plunger 31 of the solenoid pivoting switch 26. The heel 26' of the switch contacts the next succeeding cap and thereby prevents rotation of the disk 15 permitting the cap being inspected to drop out of the apparatus onto ejection chute 14 (Fig. 3). Positive ejection of the rejected cap is obtained by a blast of air from air pipe 33.

After the cap has been removed the solenoid is de-energized by light from light source 38 projecting downwardly into the photocell 44. This causes the capacitor 53 to be charged sufficiently to interrupt the firing of the Thyratron and in turn de-energize the solenoid circuit. The removal of the restraining action of the heel 26' permits the disk 15 to move in its normal intermittent fashion bringing caps to the inspection station and discharging said caps onto chute section 13.

Actuation of the ejection mechanism during the interval, when the disk 15 is rotating and the next succeeding cap is being brought into position at the inspection station, is prevented by the light reflected from the under surface of the disk 15.

The electrical wiring of the apparatus may be modified, for example, as shown in Fig. 6, to inspect caps wherein the cap material has a greater reflectivity than the liner material. As shown in Fig. 6, the photocell elements are connected in such a manner that anode 48' is connected to point 51, and cathode 50' is connected to terminal 49 and grid 59 of the Thyratron. The capacitor 53 is eliminated as is the light source 38. In addition the disk 15 is made of a material, or the under surface thereof is coated with a material, having a reflectivity equal to or less than the liner material.

During the interval when terminal 57 is negative the Thyratron cannot fire since the plate is negative. Similarly the photocell cannot pass current since its cathode is positive. During the next half cycle, terminal 49 is negative and terminal 57 is positive. The photocell will then have very little if any light reflected thereto if a liner is present in the cap, since the liner has a much lesser reflectivity than the cap. The lack of current flow in the photocell circuit will place the grid 59 of the Thyratron at the same negative potential as terminal 49 and thereby prevent the Thyratron from firing.

If a liner is absent from the cap, light will be reflected by the cap to the photocell causing a current flow in the photocell circuit and a resultant voltage drop across resistance 52. This will cause the cathode of the photocell to be at a less negative potential than terminal 49 and in turn place a less negative potential on the grid 59 of the Thyratron permitting the Thyratron to fire. Firing of the Thyratron will cause energization of the solenoid circuit and rejection of the cap in the same manner as in the other form of the invention. After the cap has been rejected the light from light source 43 is not reflected to the photocell 44 and as a result no current will flow in the photocell circuit thereby making the grid potential on the Thyratron more negative and interrupting the flow of current in the Thyratron. This will de-energize the solenoid circuit and permit further operation of the apparatus.

It is thus apparent that the invention comprises a method and apparatus for quickly, easily and efficiently inspecting caps. The method and apparatus may be readily adapted to either the manufacturer's plant or the packager's plant. For example, the invention could be utilized wherever caps are being fed in a chute and the inspection would take place without impeding any subsequent operation. The invention utilizes the weight of the caps to control their movement during the inspection and thereby does not require any complicated power mechanism to obtain intermittent movement thereof. In instances where the invention is utilized in a chute which conveys the caps to some other operating mechanism, any interruption in the flow of caps out of the chute will cause an automatic stoppage of the inspection, without the need for any complicated mechanism.

The invention has been described and shown wherein light is directed upwardly into the cap but the apparatus is equally operable when inverted and the light is directed downwardly into the caps, the weight of the caps being supported by the intermediate plate 28.

Modifications may be resorted to within the spirit and scope of the appended claims.

We claim:

1. An apparatus for inspecting caps having liners therein which comprises a carrier for conveying caps to an inspection station and having a surface of substantially the same reflectivity as the liners being inspected, said carrier being so constructed and arranged that it is free to move by the action of the weight of the caps, means for causing intermittent movement of said carrier, means at said inspection station for directing light into each cap as it is moved to said inspection station, means for collecting the light reflected from each said cap, electroresponsive means controlled by the light collecting means and operable by an electric impulse in the light collecting means circuit caused by a sudden change in the amount of light transmitted to the light collecting means when a cap without a liner therein traverses the said light beam, and means actuated by the electroresponsive means to cause the removal of the cap without a liner.

2. An apparatus for inspecting caps having liners therein comprising a carrier having a surface of substantially the same reflectivity as the liners, said carrier having a series of equally spaced openings therein, means for maintaining the caps in register with the openings along said carrier, said carrier being so constructed and arranged that the weight of the caps causes movement thereof thereby carrying the caps in succession to an inspection station, means for causing the movement of the carrier to be intermittent thereby bringing each cap to rest momentarily at the inspection station, means for directing a light into each cap at said station, a photocell positioned to collect light reflected from the cap, electroresponsive means controlled by the photocell and operable by an electric impulse in the photocell circuit caused by a sudden change in the amount of light transmitted to the cell when a cap without a liner therein traverses the light beam, and means actuated by the electroresponsive means to change the path of movement of a cap without a liner.

3. An apparatus for inspecting caps having liners therein which comprises a disk mounted for rotation about its axis, said disc having equally spaced openings on the periphery thereof, a star wheel mounted for rotation with and about the same axis as said disk, said star wheel having pockets along the periphery thereof in register with the openings in said disk whereby caps are maintained in concentric relationship with said openings, means for guiding caps onto said disk and into said pockets, the weight of the caps entering said disk tending to cause rotation of said disk and star wheel, means for causing the rotation of said disk and said star wheel to be intermittent, each movement of the disk being equal to the peripheral distance between successive openings in said disk thereby bringing each cap in succession to an inspection station and causing said cap to pause momentarily at said station, means adjacent the inspection station for directing a light into each cap, a photocell positioned to collect the light reflected from said cap, electroresponsive means to which the output of the photocell is directed and operable by an electric impulse caused by a sudden change in the amount of light reflected to the photocell when a cap without a liner traverses the light beam, and means actuated by the electroresponsive means to cause a cap without a liner to move off said disk.

4. An apparatus for inspecting caps having liners therein which comprises a disk mounted for rotation about its axis, said disk having equally spaced openings along the periphery thereof, one surface of said disk having a reflectivity substantially equal to the reflectivity of the liner material, a star wheel mounted for rotation with and about the same axis as said disk, said star wheel having pockets along the periphery thereof in register with the openings in said disk whereby caps are maintained in concentric relationship with said openings, means for guiding caps onto said disk and into said pockets, the weight of the caps entering said disk tending to cause rotation of said disk and star wheel, means for causing the rotation of said disk and star wheel to be intermittent, each movement of the disk being equal to the peripheral distance between successive openings in said disk thereby bringing each cap in succession to an inspection station and causing said cap to pause momentarily at said station, means for directing a light beam into each cap, said means positioned at the inspection station adjacent the surface of the disk having the reflectivity equal to the reflectivity of the liner material, a photocell positioned to collect the light reflected from said cap, electroresponsive means to which the output of the photocell is directed and operable by an electric impulse caused by a sudden change in the amount of light reflected to the photocell when a cap without a liner traverses the light beam, and means actuated by the electroresponsive means to cause a cap without a liner to move off said disk.

5. An apparatus for inspecting caps having liners therein which comprises a disk mounted for rotation about its axis, said disk having equally spaced openings along the periphery thereof, one surface of said disk having a reflectivity substantially equal to the reflectivity of the liner material, a star wheel mounted for rotation with and about the same axis as said disk, said star wheel having pockets along the periphery thereof in register with the openings in said disk whereby caps are maintained in concentric relationship with said openings, means for guiding caps onto said disk and into said pockets, the weight of the caps entering said disk tending to cause rotation of said disk and star wheel, means for causing the rotation of said disk and star wheel to be intermittent, each movement of the disk being equal to the peripheral distance between successive openings in said disk thereby bringing each cap in succession to an inspection station and causing said cap to pause momentarily at said station, means for directing a light beam into each cap, said means positioned at the inspection station adjacent the surface of the disk having the reflectivity equal to the reflectivity of the liner material, a photocell positioned to collect the light reflected from said cap, electroresponsive means controlled by the photocell and operable by an electric impulse in the photocell circuit caused by a sudden change in the amount of light transmitted to the cell when a cap without a liner traverses the light beam, a solenoid mounted adjacent the inspection station, a circuit electrically connecting said solenoid to said electroresponsive means whereby said solenoid is energized by completion of said circuit when a cap without a liner traverses the light beam and and operates the electroresponsive means and a switch at said inspection station for guiding and maintaining the caps in position on the disk, said switch being pivotally mounted and connected to said solenoid in such a manner that the switch is pivoted out of its position when the solenoid is energized, thereby permitting the cap to move in a different path under the action of gravity.

6. An apparatus for inspecting caps having liners therein which comprises a disk mounted for rotation about its axis and having equally spaced openings along the periphery thereof, one surface of said disk having a greater reflectivity than the reflectivity of the liner material, a star wheel mounted for rotation with and about the same axis as said disk, said star wheel having pockets along the periphery thereof in register with the openings in said disk whereby caps are maintained in concentric relationship with said openings, means for guiding the caps onto said disk and into said pockets, the weight of the caps entering said disk tending to cause rotation of said disk and star wheel, means for causing the rotation of said disk and said star wheel to be intermittent, each movement of the disk being equal to the peripheral distance between successive openings in said disk thereby bringing each cap in succession to an inspection station and causing said cap to pause momentarily at said station, means adjacent the inspection station for directing a light beam into each cap, a photocell positioned to collect the light reflected from said cap, electroresponsive means to which the output of the photocell is directed and operable by an electric impulse in the photocell circuit caused by a sudden change in the amount of light reflected to the photocell when a cap without a liner therein traverses the light beam and means actuated by the electroresponsive means to cause a cap without a liner to move off said disk.

7. An apparatus for inspecting caps having liners therein which comprises an upper plate, an intermediate plate parallel with and spaced from said upper plate, a lower plate parallel with and spaced from the intermediate plate, a shaft jewelled for free rotation between said upper and lower plates, said intermediate plate having a portion thereof cut away to prevent interference with the free rotation of the shaft, a star wheel mounted on said shaft between the intermediate and lower plates, a disk mounted to rotate with said star wheel and positioned between said star wheel and lower plate, said disk having equally spaced openings along the periphery thereof and having one surface thereof adjacent the lower plate with a reflectivity substantially equal to the reflectivity of the liner material, said star wheel having pockets along the periphery thereof in register with the openings in said disk whereby caps are maintained in concentric relationship with said openings, means for guiding caps onto said disk and into said pockets, and escapement mechanism mounted between said upper plate and intermediate plate for causing the movement of the disk and star wheel to be intermittent, said escapement mechanism comprising an escapement wheel mounted on the shaft and an escapement pendulum pivotally mounted on the intermediate plate, said lower plate having an inspection opening therein along the path of the caps, means mounted below said opening for directing light upwardly through said latter opening into a cap as it is caused to pause momentarily thereover, a photocell positioned adjacent said opening to collect the light reflected from said cap, electroresponsive means controlled by said photocell and operable by an electric impulse in the photocell circuit caused by a sudden change in the amount of light transmitted to the photocell when a cap without a liner therein traverses the light beam, and means actuated by the electroresponsive means to cause a cap without a liner to move off said disk.

8. An apparatus for inspecting caps having liners therein which comprises an upper plate, an intermediate plate parallel with and spaced from said upper plate, a lower plate parallel with and spaced from the intermediate plate, a shaft jewelled for free rotation between said upper and lower plates, said intermediate plate having a portion thereof cut away to prevent interference with the free rotation of the shaft, a star wheel mounted on said shaft between the intermediate and lower plates, a disk mounted to rotate with said star wheel and positioned between said star wheel and lower plate, said disk having equally spaced openings along the periphery thereof and having one surface thereof adjacent the lower plate with a reflectivity substantially equal to the reflectivity of the liner material, said star wheel having pockets along the periphery thereof in register with the openings in said disk whereby caps are maintained in concentric relationship with said openings, means for guiding caps onto said disk and into said pockets, an escapement mechanism mounted between said upper plate and intermediate plate for causing the movement of the disk and star wheel to be intermittent, said escapement mechanism comprising an escapement wheel mounted on the shaft and an escapement pendulum pivotally mounted on the intermediate plate, said lower plate having an inspection opening therein along the path of the caps, means mounted below said opening for directing light upwardly through said opening into a cap as it is caused to pause momentarily thereover, a photo cell positioned adjacent said opening to collect the light reflected from said cap, electroresponsive means controlled by said photocell and operable by an electric impulse in the photocell circuit caused by a sudden change in the amount of light transmitted to the photocell when a cap without a liner therein traverses the light beam, a solenoid mounted adjacent the inspection opening in the lower plate, a circuit electrically connecting said solenoid to the electroresponsive means whereby said solenoid is energized by completion of the circuit when a cap without a liner traverses the light beam, a railing at said inspection station for guiding and maintaining the caps in position on the disk, said railing being pivotally mounted and connected to said solenoid in such a manner that said railing is pivoted out of its position when the solenoid is energized thereby permitting the cap to move in a different path under the action of gravity.

9. The apparatus set forth in claim 8, said railing having a portion thereof which projects into the path of the caps when the railing is pivoted out of its position, thereby preventing further movement of the caps while the railing is out of position.

10. An apparatus for inspecting caps having liners therein which comprises an upper plate, an intermediate plate parallel with and spaced from said upper plate, a lower plate parallel with and spaced from the intermediate plate, a shaft journaled between said upper and lower plates, said intermediate plate having a portion thereof cut away to prevent interference with the free rotation of the shaft, a star wheel mounted on said shaft between the intermediate and lower plates, a disk mounted for rotation with said star wheel and positioned adjacent the lower plate, said disk having equally spaced openings along the periphery thereof and having one surface thereof adjacent the lower plate with a reflectivity substantially equal to the reflectivity of the liner material, said star wheel having pockets along the periphery thereof in register with the openings in said disk whereby caps are maintained in concentric relationship with said openings, means for guiding caps onto said disk and into said pockets, an escapement mechanism mounted between said upper plate and intermediate plate for causing the movement of the disk and star wheel to be intermittent, said escapement mechanism comprising an escapement wheel mounted on the shaft and an escapement pendulum pivotally mounted on the intermediate plate, said lower plate having an inspection opening therein along the path of the caps, means mounted below said opening for directing light upwardly through said opening into a cap as it is caused to pause momentarily thereover, a photocell positioned adjacent said opening to collect the light reflected from said cap, electro-responsive means controlled by said photocell and operable by an electric impulse in the photocell circuit caused by a sudden change in the amount of light transmitted to the photocell when a cap without a liner therein traverses the light beam, a solenoid mounted adjacent the inspection opening in the lower plate, a circuit electrically connecting said solenoid to the electroresponsive means whereby said solenoid is energized by completion of the circuit when a cap without a liner traverses the light beam, a railing at said inspection station for guiding and maintaining the caps in position on the disk, said railing being pivotally mounted and connected to said solenoid in such a manner that said railing is pivoted out of its position when the solenoid is energized thereby permitting the cap to move in a different path under the action of gravity, said upper plate and intermediate plate having openings therethrough in concentric relationship to the inspection opening in said lower plate, and a light source positioned above the opening in the upper plate thereby providing light to the photocell after rejection of a cap and causing the electroresponsive means to de-energize the solenoid.

11. The apparatus set forth in claim 10, said railing having a portion thereof which projects into the path of the caps when the railing is pivoted out of its position, thereby preventing further movement of the caps while the railing is out of position.

12. An apparatus for inspecting caps having liners therein which comprises a disk mounted for rotary movement, said disk having equally spaced openings on the periphery thereof, a star wheel mounted for rotation about the same axis as said disk and in unison therewith, said star wheel having pockets along the periphery thereof in register with the openings in said disk whereby caps are maintained in concentric relationship with said openings, means for guiding caps onto said disk and into said pockets, the weight of the caps entering said disk tending to cause rotation of said disk and star wheel, means for causing the rotation of said disk and said star wheel to be intermittent, each movement of the disk being equal to the peripheral distance between successive openings in said disk thereby bringing each cap successively to an inspection station and causing said cap to pause momentarily at said station, means adjacent the inspection station for directing a light into each cap, a photocell positioned to collect the light reflected from said cap, electroresponsive means controlled by said photocell and operable by an electric impulse in the photocell circuit caused by a sudden change in the amount of light transmitted to the cell when a cap without a liner therein traverses the light beam, means actuated by the electroresponsive means to cause a cap to move off said disk, a cap without a liner traverses the light beam, and a light source positioned in alignment with said photocell at the inspection station thereby providing light to the photocell after rejection of a cap and causing the electroresponsive means to de-actuate the means for causing the caps to move off the disk.

13. Apparatus for inspecting closure caps with liners thereon, said apparatus comprising a carrier in the form of a disk mounted for free rotation about its axis, the disk and its axis being inclined to the vertical, means for feeding the caps with the liners therein in succession to and onto the disk at one side of the vertical plane of said axis and thereby causing the disk with the cap thereon to be rotated by gravity and the cap brought in succession to an inspecting station, and an escapement device cooperating with the disk and operable to momentarily arrest the movement of the disk as each cap is brought to the said inspecting station.

14. Apparatus for inspecting closure caps with liners thereon, said apparatus comprising a carrier in the form of a disk mounted for free rotation about its axis, the disk and its axis being inclined to the vertical, means for feeding the caps with the liners therein in succession to the disk at one side of the vertical plane of said axis and thereby causing the disk with the caps thereon to be rotated by gravity and the caps brought into succession to an inspecting station, an escapement device cooperating with the disk and operable to momentarily arrest the movement of the disk as each cap is brought to the said inspecting station, and inspecting means positioned at the inspecting station and comprising a light source mounted in position to direct a light beam against the liners in said station, a photoelectric cell positioned to receive the reflected light and electroresponsive means controlled by the electrical circuit of said cell for indicating caps in which the liners are missing.

15. The apparatus defined in claim 14, said disk being formed with openings therethrough, means for holding the caps in inverted position on the disk with the caps and liners centered over the openings, the light source and photocell being so positioned beneath the disk that the light beam is directed through said openings to the liners and reflected thereby, said disk having a reflecting surface in the path of the light beam and by which the continuity of reflection is maintained during the intermittent rotation of the disk, and electroresponsive means controlled by the electrical circuit of said cell for indicating caps in which the liners are missing.

References Cited in the file of this patent

UNITED STATES PATENTS

| | | |
|---|---|---|
| 2,070,339 | Moore | Feb. 9, 1937 |
| 2,222,895 | Carris et al. | Nov. 26, 1940 |
| 2,382,863 | Decker et al. | Aug. 14, 1945 |
| 2,584,327 | Capstock et al. | Feb. 5, 1952 |